(12) United States Patent
Dvorak (10) Patent No.: US 10,147,259 B1
(45) Date of Patent: Dec. 4, 2018

(54) BALLOT ADJUDICATION SYSTEM AND METHOD

(71) Applicant: Election Systems & Software, LLC, Omaha, NE (US)

(72) Inventor: Michael Dvorak, Plattsmouth, NE (US)

(73) Assignee: Election Systems & Software, LLC, Omaha, NE (US)

( * ) Notice: Subject to any disclaimer, the term of this patent is extended or adjusted under 35 U.S.C. 154(b) by 0 days.

(21) Appl. No.: 15/709,095

(22) Filed: Sep. 19, 2017

(51) Int. Cl.
| | |
|---|---|
| *G07C 13/00* | (2006.01) |
| *G06K 7/10* | (2006.01) |
| *G06K 1/12* | (2006.01) |
| *G06K 7/14* | (2006.01) |
| *G09F 3/00* | (2006.01) |
| *G09F 3/10* | (2006.01) |

(52) U.S. Cl.
CPC ............. *G07C 13/00* (2013.01); *G06K 1/121* (2013.01); *G06K 7/10762* (2013.01); *G06K 7/1413* (2013.01); *G06K 7/1417* (2013.01); *G09F 3/0297* (2013.01); *G09F 3/10* (2013.01); *G06Q 2230/00* (2013.01)

(58) Field of Classification Search
CPC .. G07C 13/00; G06K 7/1413; G06K 7/10762; G06K 7/1417; G06K 1/121; G09F 9/0297; G06Q 2230/00
USPC ........................................................ 235/385
See application file for complete search history.

(56) References Cited

U.S. PATENT DOCUMENTS

| | | | |
|---|---|---|---|
| 8,261,984 B2 | 9/2012 | Baumert et al. | |
| 8,814,045 B1 | 8/2014 | Brockhouse et al. | |
| 8,899,480 B2 | 12/2014 | Contorer et al. | |
| 8,913,787 B2 | 12/2014 | Hoover et al. | |
| 9,082,245 B2 | 7/2015 | Griggs | |
| 9,153,085 B2 | 10/2015 | Euchner et al. | |
| 9,202,113 B2 | 12/2015 | Hoover et al. | |
| 9,240,085 B2 | 1/2016 | Baumert et al. | |
| 9,619,956 B2 | 4/2017 | Contorer et al. | |
| 2007/0095909 A1 | 5/2007 | Chaum | |
| 2010/0252628 A1* | 10/2010 | Chung | G07C 13/00 235/386 |
| 2011/0089236 A1* | 4/2011 | Chung | A63F 3/06 235/386 |
| 2012/0217299 A1* | 8/2012 | Vall S Fontanals | G07C 13/00 235/386 |
| 2012/0248185 A1 | 10/2012 | Contorer et al. | |
| 2013/0301873 A1 | 11/2013 | Hoover et al. | |
| 2014/0207537 A1 | 7/2014 | Joyce et al. | |

(Continued)

FOREIGN PATENT DOCUMENTS

| | | |
|---|---|---|
| EP | 2691931 A2 | 2/2014 |
| EP | 2759985 A1 | 7/2014 |

*Primary Examiner* — Claude J Brown
(74) *Attorney, Agent, or Firm* — Stinson Leonard Street LLP (57) ABSTRACT

Automated entry of voting selections that were properly marked on the paper ballot during ballot adjudication. A ballot processing system is configured to generate an optical, machine-readable code that includes data representative of the voting selections for all contests that were properly marked on the paper ballot. An electronic voting system is configured to read the code and present to the election official only contests having improper markings on the paper ballot (i.e., requiring adjudication).

20 Claims, 8 Drawing Sheets

(56) References Cited

U.S. PATENT DOCUMENTS

| | | | |
|---|---|---|---|
| 2014/0263639 A1* | 9/2014 | Bolton | G07C 13/00 235/386 |
| 2015/0071501 A1 | 3/2015 | Hoover et al. | |
| 2015/0076228 A1 | 3/2015 | Contorer et al. | |
| 2017/0039792 A1 | 2/2017 | Perez et al. | |
| 2017/0213407 A1 | 7/2017 | Contorer et al. | |

\* cited by examiner

BALLOT ADJUDICATION SYSTEM AND METHOD

TECHNICAL FIELD

Aspects of the present disclosure generally relate to voting systems and, more particularly, to systems and methods that automate aspects of adjudicating improperly marked ballots.

BACKGROUND

A variety of different types of voting equipment are used in the United States and throughout the world. In many jurisdictions, a voter receives a paper ballot on which is printed the various contests to be voted on. The voter votes by darkening or otherwise marking the appropriate voting selection spaces on the paper ballot. The marked paper ballot may then be dropped in a ballot box, whereby the paper ballots accumulated in the ballot box are transferred to a central election office for tabulation. At the central election office, a central ballot counter is used to scan and tabulate the voting selections marked on paper ballots received from various polling locations.

In some instances, the central ballot counter is unable to read ballots that include improper markings. These ballots must be diverted from properly read ballots and adjudicated by a human election official. The election official must then manually recreate the ballot. Even when using electronic voting systems to recreate improperly marked ballots, the election official must enter every selection from the paper ballot into the electronic voting system. The manual recreation of ballots and manual entry of every selection is time-consuming and prone to human error in marking or entering selections for contests that were properly marked on the paper ballot.

SUMMARY

Aspects of the disclosure automate entry of voting selections that were properly marked on the paper ballot and enable an election official to enter selections only for contests having improper markings. In one form, a ballot processing system generates an optical, machine-readable code that includes data representative of the voting selections for all contests that were properly marked on the paper ballot. An electronic voting system reads the code and presents to the election official only those contests requiring adjudication. In this manner, aspects of the present disclosure provide time savings and reduce the likelihood of human error in re-entering selections that were properly marked on the paper ballot.

In an aspect, a system for processing a plurality of ballots includes an imager, a ballot processor, an output tray, an optical scanner, a display, and a ballot marking processor. The ballots each include one or more contests and one or more voting selections that can be marked with a marking for each contest. The imager is configured to generate an image of each of the plurality of ballots. The ballot processor is electrically coupled to the imager and is configured to process the image of each ballot to determine the propriety of markings of the voting selections of the ballots. The ballot processor is further configured to print a barcode for each ballot having at least one improperly marked voting selection. The barcode includes a machine-readable representation of any properly marked voting selections. The output tray is positioned to accumulate the ballots having at least one improperly marked voting selection. The optical scanner is configured to scan the barcode for a respective ballot. The ballot marking processor is electrically coupled to the optical scanner and the display. The ballot marking processor is configured to extract the properly marked voting selections from the scanned barcode. The ballot marking processor is further configured to display each contest requiring adjudication on the display and receive voting selections for each contest requiring adjudication. The contests requiring adjudication include contests having improperly marked voting selections. The ballot marking processor is further configured to print a vote summary card that includes machine-readable representations of the extracted properly marked voting selections and the received voting selections for each contest requiring adjudication.

In another aspect, a ballot processor implements a method of processing ballots that each include one or more contests and one or more voting selections that can be marked with a marking for each contest. The method includes generating an image of each of the ballots and determining a propriety of the markings of the voting selections of the ballots. The method further includes printing a barcode for each ballot having at least one improperly marked voting selection. The barcode includes a machine-readable representation of any properly marked voting selections on such ballot. The method further includes accumulating the ballots having at least one improperly marked voting selection. The barcode for a respective ballot is scanned and the properly marked voting selections from the scanned barcode are extracted. Moreover, the method includes displaying each contest requiring adjudication. The contests requiring adjudication includes contests having improperly marked voting selections. The method further includes receiving voting selections for each contest requiring adjudication and printing a vote summary card. The vote summary card includes machine-readable representations of the extracted properly marked voting selections and the received voting selections for each contest requiring adjudication.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
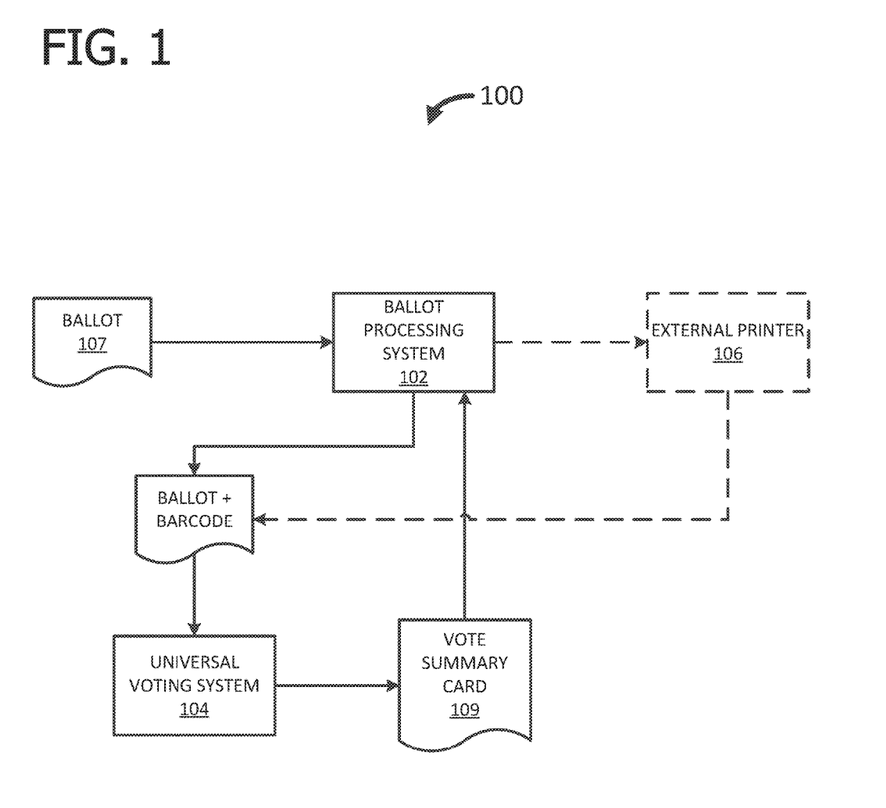
FIG. 1 is a block diagram illustrating an exemplary ballot adjudication system according to an embodiment.

FIG. 1 illustrates an exemplary embodiment of a ballot adjudication system, generally indicated at 100. The system 100 includes a ballot processing system 102 and a universal voting system 104. In an alternative embodiment, the system 100 further includes an external printer 106.

The ballot processing system 102 is configured to receive one or more paper ballots 107, scan each ballot 107, store an image of each scanned ballot, process the ballot images to determine the voting selections marked on the ballots, tabulate the marked voting selections, and sort the ballots into appropriate output bins. An exemplary ballot processing system includes the D5850® high-speed scanner and tabulator available from Election Systems & Software, LLC. Aspects of ballot processing system 102 are further described herein and in U.S. Pat. No. 8,261,984, the entire disclosure of which is expressly incorporated herein by reference, including the contents and teachings of any references contained therein.

The ballot processing system 102 is also configured to determine the propriety of voting selections (e.g., distinguish between properly marked voting selections and improperly marked voting selections) on the ballots 107. As used herein, improperly marked voting selections include marginal marks, extraneous marks, over votes, under votes, no votes, crossover votes, and the like. Marginal marks include marks within voting selection target areas (e.g., ovals, etc.) that are not reliably detectable by an optical scanner. Extraneous marks include marks that are outside of a voting selection target area. Over-voted ballots include ballots 107 having at least one contest with more than the allowable number of votes. Under-voted ballots include ballots 107 having at least one contest with less than the allowable number of votes. No-voted ballots include ballots 107 having at least one contest with no votes. Crossover-voted ballots include ballots 107 having votes in contests for more than one political party where the ballot 107 contains the contests for each political party in a primary election and the voter is allowed to vote for only one of those political parties.

The ballot processing system 102 is also configured to divert each ballot 107 into an output bin based on the processing of the ballot 107. For instance, a ballot 107 that includes properly marked voting selections for every contest is diverted to a first output bin, and a ballot 107 that includes at least one contest with improperly marked voting selections is diverted to a second output bin. In an embodiment, ballots that include at least one contest with improperly marked voting selections may be referred to as ballots that require adjudication.

The ballot processing system 102 is further configured to generate a barcode for each improperly marked ballot. The barcode includes an optical, machine-readable representation of one or more of a serial number of the ballot 107, the voting selection(s) for all contests that include properly marked voting selections (if any), and no voting selection(s) (e.g., blank) for all contests that include improperly marked voting selections. In accordance with an aspect of the disclosure, including the voting selection(s) for all contests that include properly marked voting selections enables aspects of system 100 to more quickly remake ballots relative to conventional techniques by removing the need for manual reentry of properly marked voting selections. Exemplary barcodes include, but are not limited to, linear (e.g., one dimensional) barcodes, matrix barcodes (e.g., two dimensional barcodes, quick response (QR) codes, etc.), and the like.

In an embodiment, ballot processing system 102 includes a report printer configured to print the barcode on a report for affixing (e.g., via staples, paperclips, other fasteners, etc.) to the improperly marked ballot, as further described herein. In another embodiment, ballot processing system 102 includes a label printer configured to print the barcode on a label for affixing (e.g., via an adhesive backing, etc.) to the improperly marked ballot, as further described herein. In yet another embodiment, ballot processing system 102 includes a barcode printer configured to print the barcode directly on the improperly marked ballot (e.g., in an area designated specifically for the barcode, etc.). For example, the barcode printer may be located adjacent the output bin(s) for ballots 107 having improperly marked voting selections. In an alternative embodiment, ballot processing system 102 electronically transmits (e.g., via a wired or wireless electronic communications connection, etc.) data representative of the barcode to external printer 106, which is configured to print the barcode on a report and/or on a label for affixing to the improperly marked ballot 107. In this manner, the external printer 106 may comprise the report printer or the label printer, for example. In an embodiment, reports and/or labels with a barcode printed thereon are matched up to their respective improperly marked ballots 107 by a serial number or other identifying indicia on the report and/or label and the improperly marked ballot 107. In another embodiment, reports and/or labels with a barcode printed thereon are matched up to their respective improperly marked ballots 107 by the order that the ballots were processed by ballot processing system 102 and the reports and/or labels were printed.

The universal voting system 104 is configured to scan the barcode associated with (e.g., adhered to) the improperly marked ballot 107, automatically mark contests for which the improperly marked ballot 107 included proper voting selections, display contests for which the improperly marked ballot 107 includes improper voting selections, generate a vote summary card 109 including the proper voting selections (if any) from the voter-prepared ballot 107 and the voting selections (i.e., made by the adjudicator) for contests improperly marked by the voter, and print the vote summary card 109 and/or transmit data indicative of the vote summary card 109 to a tabulator and/or a database. In an embodiment, universal voting system 104 includes an optical scanner (e.g., barcode scanner) that enables universal voting system 104 to scan the barcode applied to the improperly marked ballot. In an alternative embodiment, universal voting system 104 generates a vote summary card with barcode selections for both selections that were properly marked by the voter and selections that were adjudicated by an election official. An exemplary universal voting system 104 includes the ExpressVote® system available from Election Systems & Software, LLC. In an alternative embodiment, the universal voting system is a Ballot On Demand (BOD) system that has ballot duplication capabilities with the use of barcodes. The BOD system is configured to scan the barcode associated with the improperly marked ballot 107, select all properly marked voting selections, and present a user interface (UI) that allows an election official to make adjudication corrections. The BOD system is further configured to generate a fully marked ballot with markings for both selections that were properly marked by the voter and selections that were adjudicated by an election official.

Figure 2:
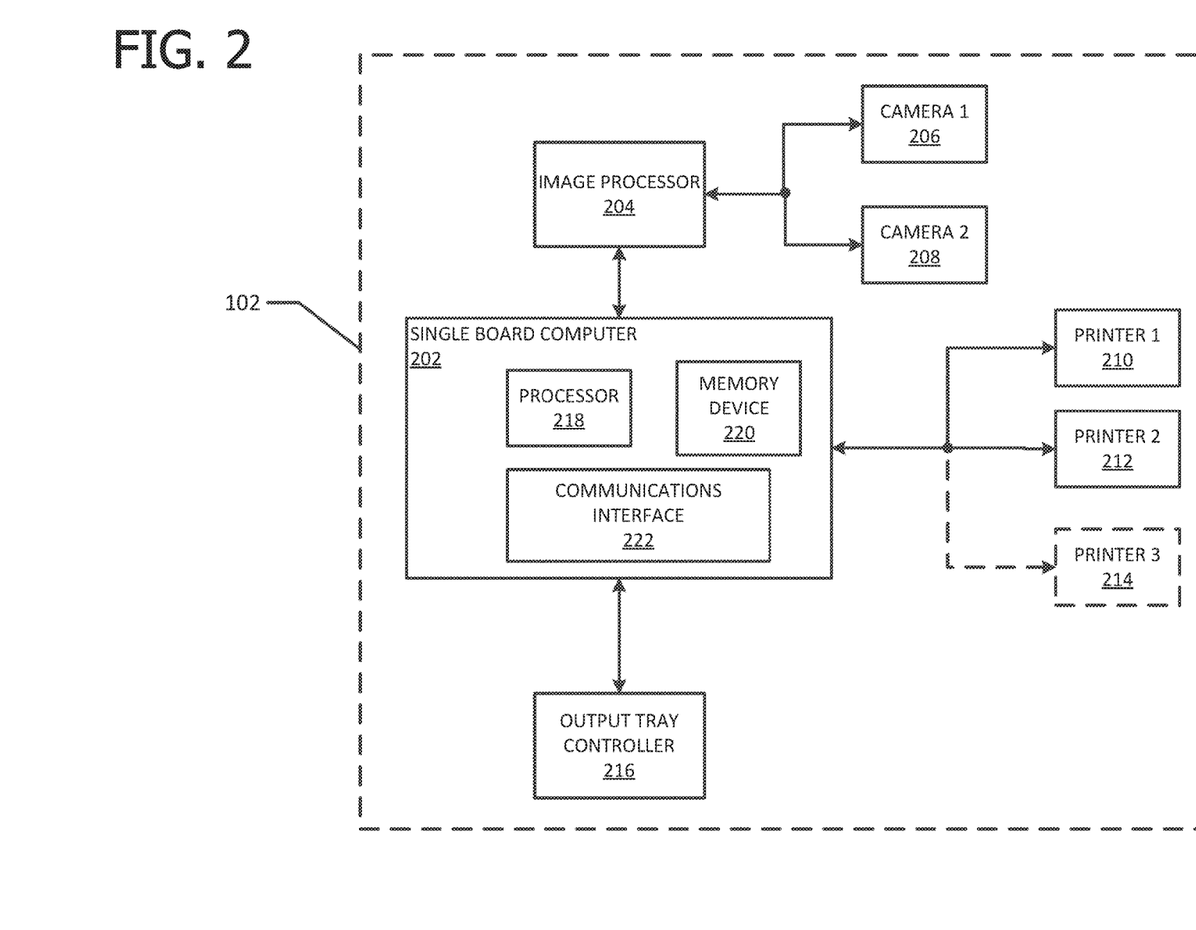
FIG. 2 is a simplified block diagram illustrating an exemplary ballot processing system according to an embodiment.

FIG. 2 is a block diagram of an exemplary embodiment of ballot processing system 102. One of ordinary skill in the art will understand that the ballot processing system 102 depicted in FIG. 2 is simplified for purposes of illustration. As illustrated in FIG. 2, ballot processing system 102 includes a computer (e.g., single board computer) 202, an image processor 204, at least one camera (e.g., cameras 206, 208), at least one printer (e.g., printers 210, 212), and an output tray controller 216. The computer 202 includes a ballot processor 218, a memory device 220, and a communications interface 222. In an alternative embodiment, ballot processing system 102 further includes a third printer 214. The computer 202 is electrically connected and/or communicatively connected to the image processor 204. The cameras 206, 208 are electrically connected and/or communicatively connected to the image processor 204. The computer 202 is electrically connected and/or communicatively connected to the printers 210, 212, 214. The computer 202 is electrically connected and/or communicatively connected to the output tray controller 216. The ballot processor 218, memory device 220, and communications interface 222 are communicatively connected and/or electrically connected to each other. Aspects of ballot processing system 102 may be electrically connected and/or communicatively connected via an internal bus, for example.

The cameras 206, 208 are configured to acquire images of ballots (e.g., ballots 107) and transmit the ballot images to the image processor 204. In an embodiment, one of cameras 206, 208 is an upper high-speed camera and the other is a lower high-speed camera. In another embodiment, cameras 206, 208 are positioned to acquire images of both sides of a double-sided ballot 107. In an exemplary embodiment, cameras 206, 208 are 60 megahertz digital electronic CCD cameras.

The image processor 204 is configured to receive the ballot images from the cameras 206, 208 and transmit the ballot images to the computer 202. In an exemplary embodiment, image processor 204 includes an analog-to-digital converter (ADC), a digital signal processor, and a digital-to analog converter (DAC). The computer 202 is configured to temporarily store the ballot images received from image processor 204 in memory device 220 (e.g., a random access memory (RAM)). Additionally or alternatively, computer 202 is configured to store the ballot images received from image processor 204 on a hard disk drive (not shown). The ballot processor 218 is configured to execute processor-executable instructions stored on memory device 220 to process the ballot image, determine voting selections marked on the ballot 107, and determine the propriety of the marked voting selections. For example, processor 218 is configured to distinguish between properly marked voting selections and improperly marked voting selections (e.g., marginal marks, extraneous marks, over votes, under votes, no votes, crossover votes, etc.) on the ballots 107. The image processor 204 is further configured to generate a barcode for each improperly marked ballot, as further described herein.

The output tray controller 216 is configured to generate control signals to divert each ballot into an output bin based on the processing of the ballot 107 by image processor 204. For instance, when image processor 204 determines that a ballot 107 that includes properly marked voting selections for every contest, output tray controller 216 generates a first control signal to divert the ballot 107 to a first output bin. When image processor 204 determines that a ballot 107 includes at least one contest with improperly marked voting selections, output tray controller 216 generates a second control signal to divert the ballot 107 to a second output bin.

The printers 210, 212 are configured to print a wide variety of system and diagnostic reports, such as output bin reports. In accordance with an embodiment of the disclosure, printers 210, 212 are configured to print a barcode generated by image processor 204 on paper for subsequent affixing to the ballot 107 associated with the barcode. Optionally, printer 214 is configured to print a barcode generated by image processor 204 on a label having an adhesive backing for subsequent affixing to the ballot 107 associated with the barcode. Exemplary printers include, but are not limited to, continuous feed dot matrix printers, cut-sheet laser printers, label printers, and the like. The printers 210, 212, and 214 may be embodied in a single printer or in separate printers in accordance with one or more aspects of the disclosure.

Figure 3:
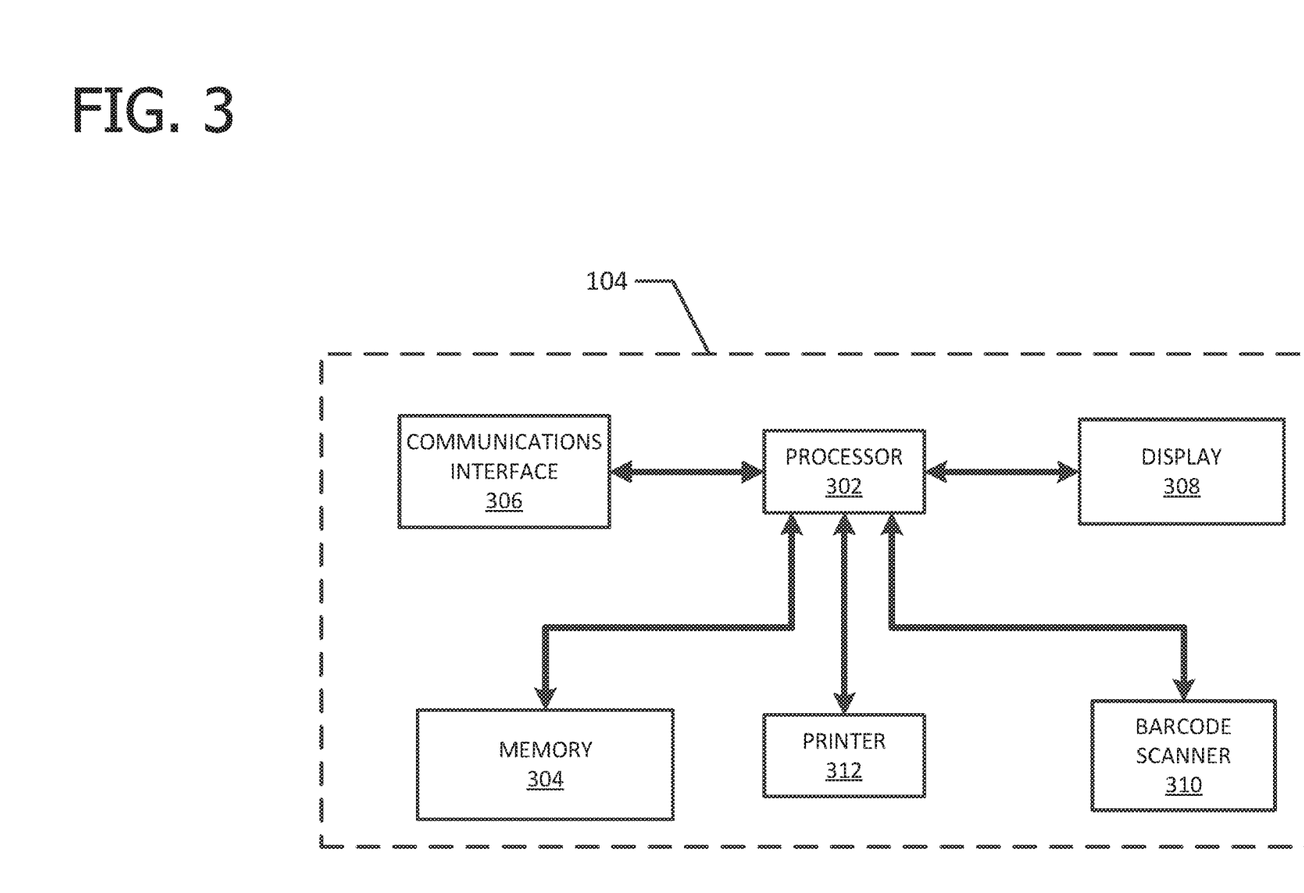
FIG. 3 is a simplified block diagram illustrating an exemplary universal voting system according to an embodiment.

FIG. 3 is a block diagram of an exemplary embodiment of universal voting system 104. One of ordinary skill in the art will understand that the universal voting system 104 depicted in FIG. 3 is simplified for purposes of illustration. As illustrated in FIG. 3, universal voting system 104 includes a ballot marking processor 302, a memory device 304, a communications interface 306, a display 308, a barcode scanner 310, and a printer 312. The ballot marking processor 302, memory device 304, communications interface 306, display 308, barcode scanner 310, and printer 312 are communicatively connected and/or electrically connected to each other.

The ballot marking processor 302 is adapted to execute processor-executable instructions stored in the memory device 304 to carry out processes for scanning a barcode affixed to an improperly marked ballot 107, executing a ballot marking process, automatically marking contests for which the improperly marked ballot 107 included proper voting selections, displaying contests for which the improperly marked ballot 107 includes improper voting selections, generating a vote summary card 109 including the proper voting selections (if any) from the voter-prepared ballot 107 and the voting selections (i.e., made by the adjudicator) for contests improperly marked by the voter, and printing the vote summary card 109, as further described herein. In this manner, universal voting system 104 comprises a special-purpose computing device for scanning a barcode affixed to an improperly marked ballot 107, executing a ballot marking process, automatically marking contests for which the improperly marked ballot included proper voting selections, displaying contests for which the improperly marked ballot includes improper voting selections, generating a vote summary card 109 including the proper voting selections (if any) from the voter-prepared ballot and the voting selections (i.e., made by the adjudicator) for contests improperly marked by the voter, and printing the vote summary card in accordance with an aspect of the disclosure.

The communications interface 306 is configured to communicatively couple universal voting system 104 to other computing devices via an electronic data communications network. For example, communications interface 306 is configured to communicatively couple universal voting system 104 to ballot processing system 102. The communications interface 306 of FIG. 3 provides a physical data connection between an electronic data communications network and universal voting system 104. In an embodiment, communications interface 306 is a network interface card (NIC) or modem. Electronic data communications networks in accordance with aspects of the disclosure include any telecommunications network that facilitates the exchange of data, such as those that operate according to the IEEE 802.3 (e.g., Ethernet) and/or the IEEE 802.11 (e.g., Wi-Fi) protocols, for example. In another embodiment, the electronic data communication network is any medium that allows data to be physically transferred through serial or parallel communication channels (e.g., copper wire, optical fiber, computer bus, wireless communication channel, etc.).

The display 308 is configured to display a graphical user interface including contests for which the improperly marked ballot includes improper voting selections and receive voting selections for those contests. In an embodiment, display 308 is an LCD display that includes a keypad for human interface. In another embodiment, display 308 is a touchscreen display device.

The barcode scanner 310 is configured to optically scan (e.g., read) the barcode applied to improperly marked ballots and provide data representative of the barcode to ballot marking processor 302. Exemplary barcode scanners include, but are not limited to, laser scanners, CCD readers (e.g., LED scanners), camera-based readers, and the like. In an embodiment, barcode scanner 310 is integrated into a housing of universal voting system 104. In another embodiment, barcode scanner 310 has its own housing (e.g., handheld scanner, etc.).

The printer 312 is configured to print the vote summary card 109. In an alternative embodiment, printer 312 is configured to print a remade ballot. Exemplary printers include, but are not limited to, laser printers, inkjet printers, and the like. In an embodiment, printer 312 is integrated into a housing of universal voting system 104. In another embodiment, printer 312 has its own housing.

Figure 4A:
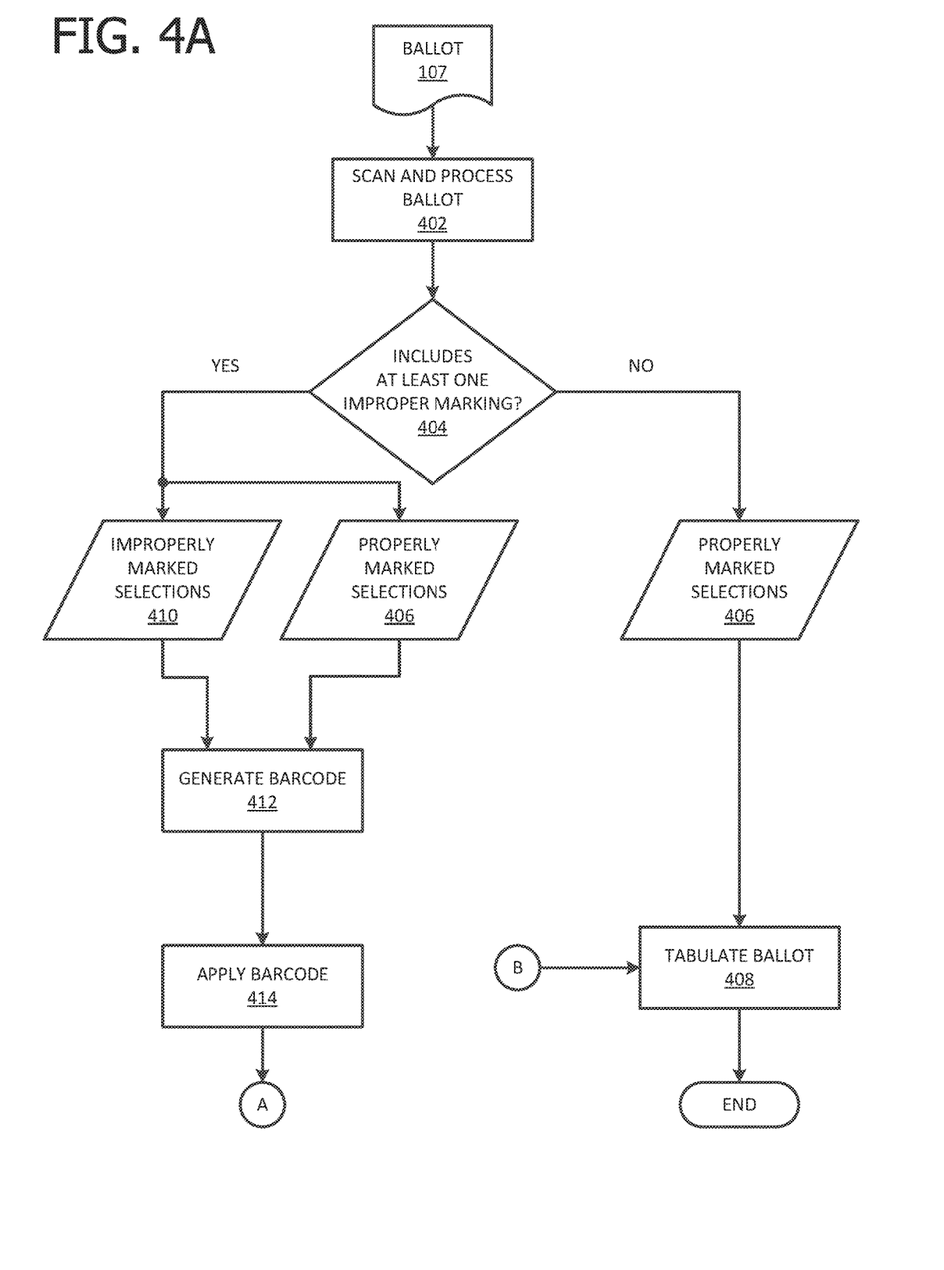
FIG. 4A is a block diagram illustrating an exemplary ballot adjudication method according to an embodiment.
Figure 4B:
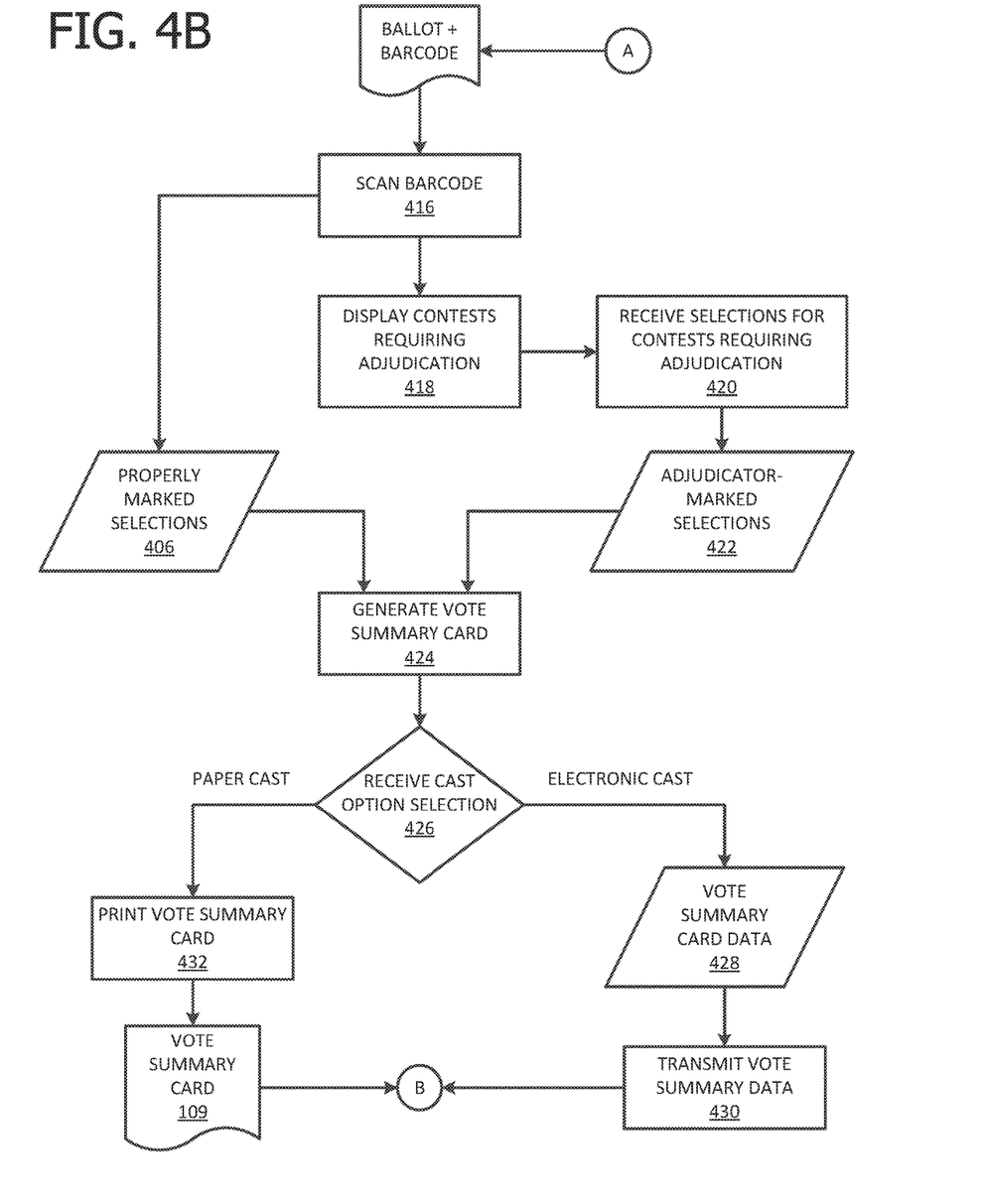
FIG. 4B is a block diagram illustrating an exemplary ballot adjudication method according to an embodiment.

FIGS. 4A and 4B illustrate an exemplary ballot adjudicating process in accordance with an aspect of the disclosure. Referring to FIG. 4A, a user (e.g., election official, etc.) inserts one or more paper ballots 107 into ballot processing system 102. The ballot processing system 102 scans and processes 402 each ballot 107. Exemplary processing includes ballot processor 218 executing processor-executable instructions for distinguishing between properly marked voting selections and improperly marked voting selections on the ballots 107. The ballot processing system 102 determines 404 whether the ballot 107 includes at least one improperly marked voting selection. When the ballot 107 does not include at least one improperly marked voting selection (i.e., all voting selections are properly marked), the ballot processing system 102 generates data 406 indicative of the properly marked voting selections and uses this data to tabulate 408 the ballot 107.

When the ballot processing system 102 determines at 404 that the ballot 107 includes at least one improperly marked voting selection, the ballot processing system 102 generates data 406 indicative of the properly marked voting selections and data 410 indicative of the improperly marked voting selections. The ballot processing system 102 then generates 412 a barcode that includes the data 406 indicative of the properly marked voting selections and the data 410 indicative of the improperly marked voting selections. In an embodiment, the barcode generated by ballot processing system 102 also includes a serial number (if available) of the ballot 107. The barcode is then applied 414 to the ballot 107. As further described herein, the barcode may be printed as a report and stapled to the ballot 107, printed as a label and applied to the ballot 107 via an adhesive, or printed directly on the ballot 107.

Referring to FIG. 4B, the ballots 107 with applied barcodes are presented to universal voting system 104. For example, a stack of ballots 107 with applied barcodes may be selected from ballot processing system 102 by an election official and carried to an available universal voting system 104 for adjudicating the ballots 107. The universal voting system 104 scans 416 (e.g., via barcode scanner 310) each of the barcoded ballots. From the scan, universal voting system 104 acquires the data 406 indicative of the properly marked voting selections and data 410 indicative of the improperly marked voting selections. In an embodiment, universal voting system 104 stores the data 406 indicative of the properly marked voting selections in memory device 304. For each contest with improperly marked voting selections, universal voting system 104 displays 418 the contest and the available voting selections via display 308. Beneficially, contests that were marked properly on the paper ballot 107 do not need to be displayed or navigated to on display 308 because the data 406 indicative of the properly marked voting selections is passed to ballot marking processor 302 via the barcode.

At 420, universal voting system 104 receives selections from the adjudicator (e.g., election official) for those contests. For example, the adjudicator looks at the original ballot 107 and determines the intended selection of the voter and then makes the appropriate selection via display 308. In an embodiment, universal voting system first displays a review screen that highlights (e.g., via a colored box, etc.) each contest requiring adjudication and enables the user adjudicator to select a contest to mark. In another embodiment, universal voting system displays the first contest requiring adjudication and once receiving the adjudicator's selections displays the next contest requiring adjudication and repeating until all contests requiring adjudication have been marked by the adjudicator. The universal voting system 104 generates data 422 indicative of the adjudicator-marked selections. In an embodiment, universal voting system 104 stores the data 422 indicative of the adjudicator-marked selections in memory device 304.

The universal voting system 104 utilizes the data 406 indicative of the properly marked voting selections as read by the barcode scanner 310 and the data 422 indicative of the adjudicator-marked selections to generate 424 a vote summary card 109 that replaces the original ballot 107 having the improperly marked voting selections. In an alternative embodiment, universal voting system 104 utilizes the data 406 indicative of the properly marked voting selections as read by the barcode scanner 310 and the data 422 indicative of the adjudicator-marked selections to generate a remade ballot that replaces the original ballot 107 having the improperly marked voting selections.

At 426, universal voting system 104 receives from the user (e.g., via display 308) a cast option selection. When the universal voting system 104 receives an electronic cast (e.g., an AutoCAST® electronic cast) option selection, the system generates data 428 indicative of the vote summary card 109 and transmits 430 the data 428 to a ballot tabulator (e.g., ballot processing system 102) to tabulate 408 the vote summary card 109. In an embodiment, universal voting system 104 transmits the data 428 indicative of the vote summary card 109 via communications interface 306 across an electronic data communications network to communications interface 222 of ballot processing system 102. When the universal voting system 104 receives a paper cast option selection, the system prints 432 the vote summary card 109 via printer 312. The printed vote summary card 109 is then transported to a ballot tabulator (e.g., ballot processing system 102) to tabulate 408 the vote summary card 109.

In an aspect, the method described herein works in all cases for ballot adjudication, is cost-effective (e.g. vote summary cards are cheaper than ballots, etc.), eliminates the need to have spare ballots for recreation, and saves the election official time in adjudicating ballots. In another aspect, the method creates a recountable record in the event of a recount, which saves work and time during a recount.

Figure 5:
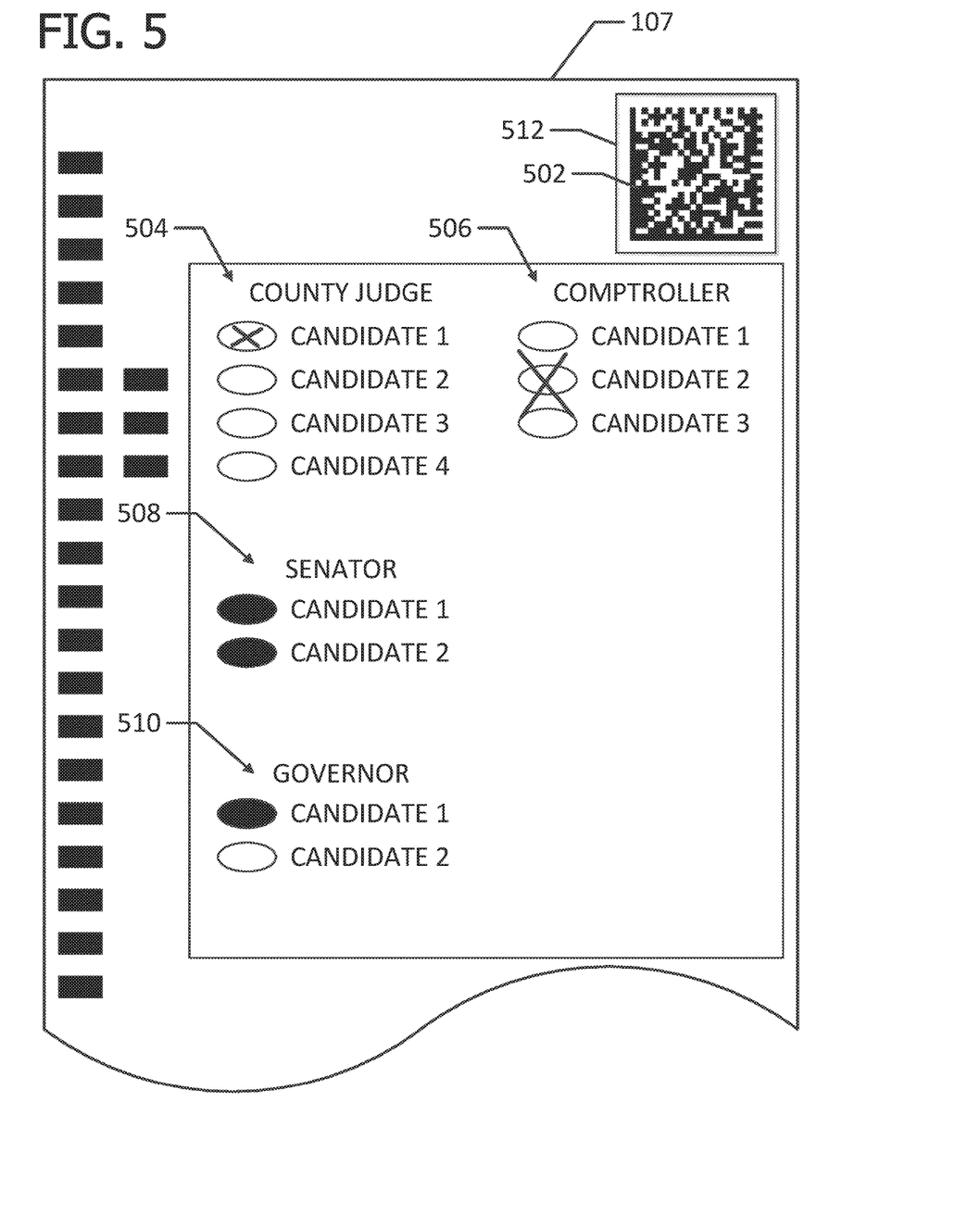
FIG. 5 illustrates an exemplary ballot and applied barcode according to an embodiment.

FIG. 5 illustrates an exemplary improperly marked ballot 107 with barcode 502 applied. The ballot 107 includes contests 504, 506, 508, 510. The contests 504, 506, and 508 include improper voting selections comprised of marginal marks, extraneous marks, and overvoted selections, respectively. The contest 510 includes a proper voting selection. In an embodiment, ballot processing system 102 detects the improper voting selections for contests 504, 506, 508 and generates barcode 502 that includes data indicative of the proper voting selection for contest 510 (e.g., the selection of Candidate 1) and no data for contests 504, 506, 508. As illustrated in FIG. 5, barcode 502 is applied to ballot 107 via an adhesive label 512. One of ordinary skill in the art will understand that barcode 502 may be applied to ballot 107 via any acceptable means, such as affixing via staple or paperclip, printing directly on the ballot, or the like as further described herein.

Figure 6:
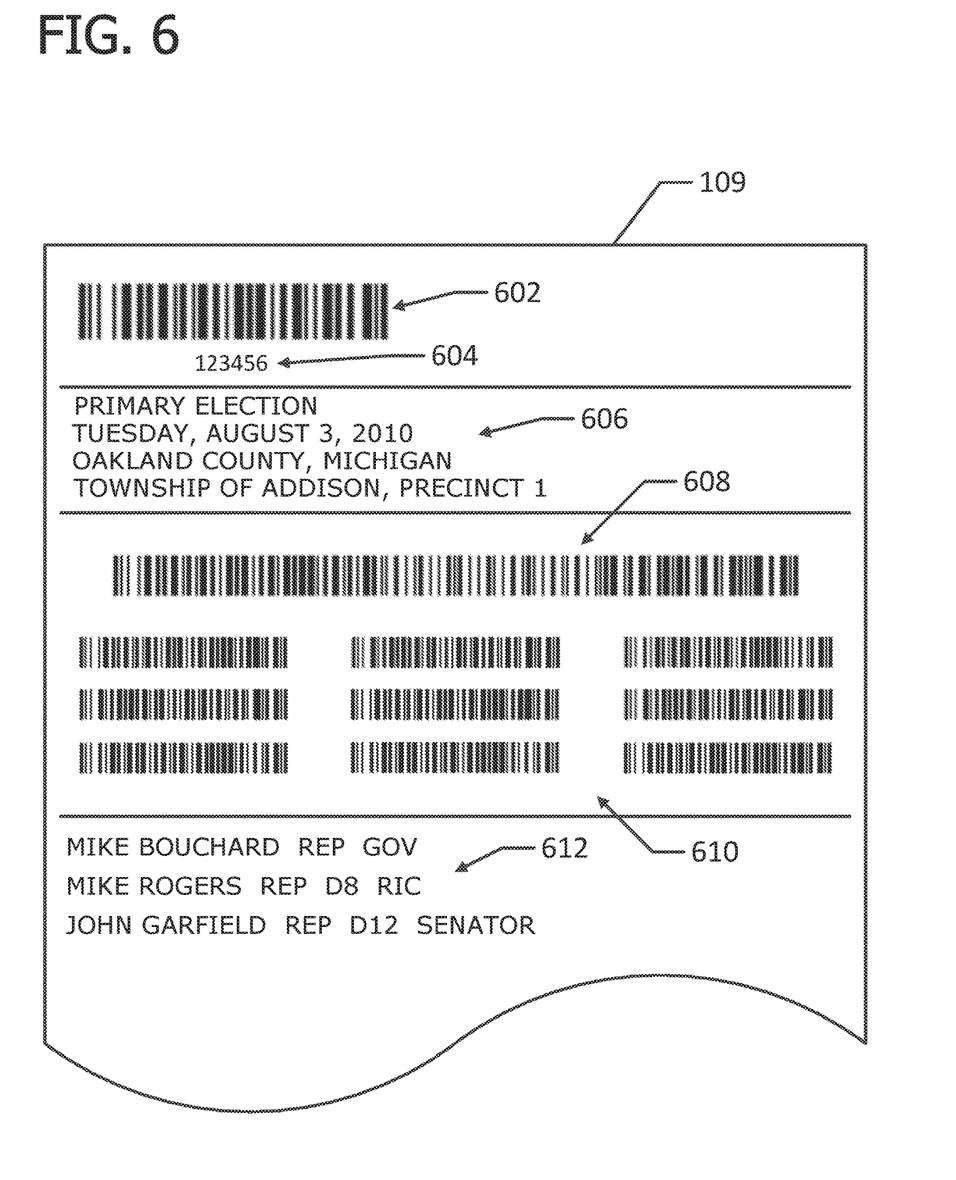
FIG. 6 illustrates an exemplary vote summary card according to an embodiment.

FIG. 6 illustrates an exemplary vote summary card 109. The vote summary card 109 includes an activation barcode 602, verification digits 604, ballot header text 606, a master barcode 608, vote selection barcodes 610, and text 612.

The activation barcode 602 includes an optical, machine-readable representation of information that identifies an election code (e.g., 000-999) before the card is voted. In an embodiment, barcode scanner 310 of universal voting system 104 reads activation barcode 602, matches it with an election definition pre-loaded on universal voting system 104, and generates the correct precinct ballot-style selection on graphical user interface voting screens displayed by display 308.

The verification digits 604 enable a human to verify the accuracy of activation barcode 602. In an embodiment, verification digits 604 are human readable. The ballot header text 606 specifies the election name and location based on activation barcode 602. In an embodiment, ballot header text 606 is human readable. The master barcode 608 includes an optical, machine-readable representation of information that enables ballot processing system 102 and/or universal voting system 104 to recognize card 109, including the number of voting selections, number of barcodes, and the like. In an embodiment, the master barcode 608 is a twenty-five digit barcode that includes a Precinct Internal ID (e.g., 10 digits), a Logical Ballot ID (e.g., 10 digits), Write-In Selections (e.g., 3 digits), and Total Selections (e.g., 3 digits). The vote selection barcodes 610 each include an optical, machine-readable representation of information that represents marked voting selections. The text 612 includes human-readable information that represents marked voting selections. In an embodiment, the vote selection barcodes 610 correspond to the selections shown in text 612. In one embodiment, ballot header text 606 is printed by the card printer at the same time as activation barcode 602. In an alternative embodiment, ballot header text 606 is printed when vote selection barcodes 610 are printed.

Figure 7:
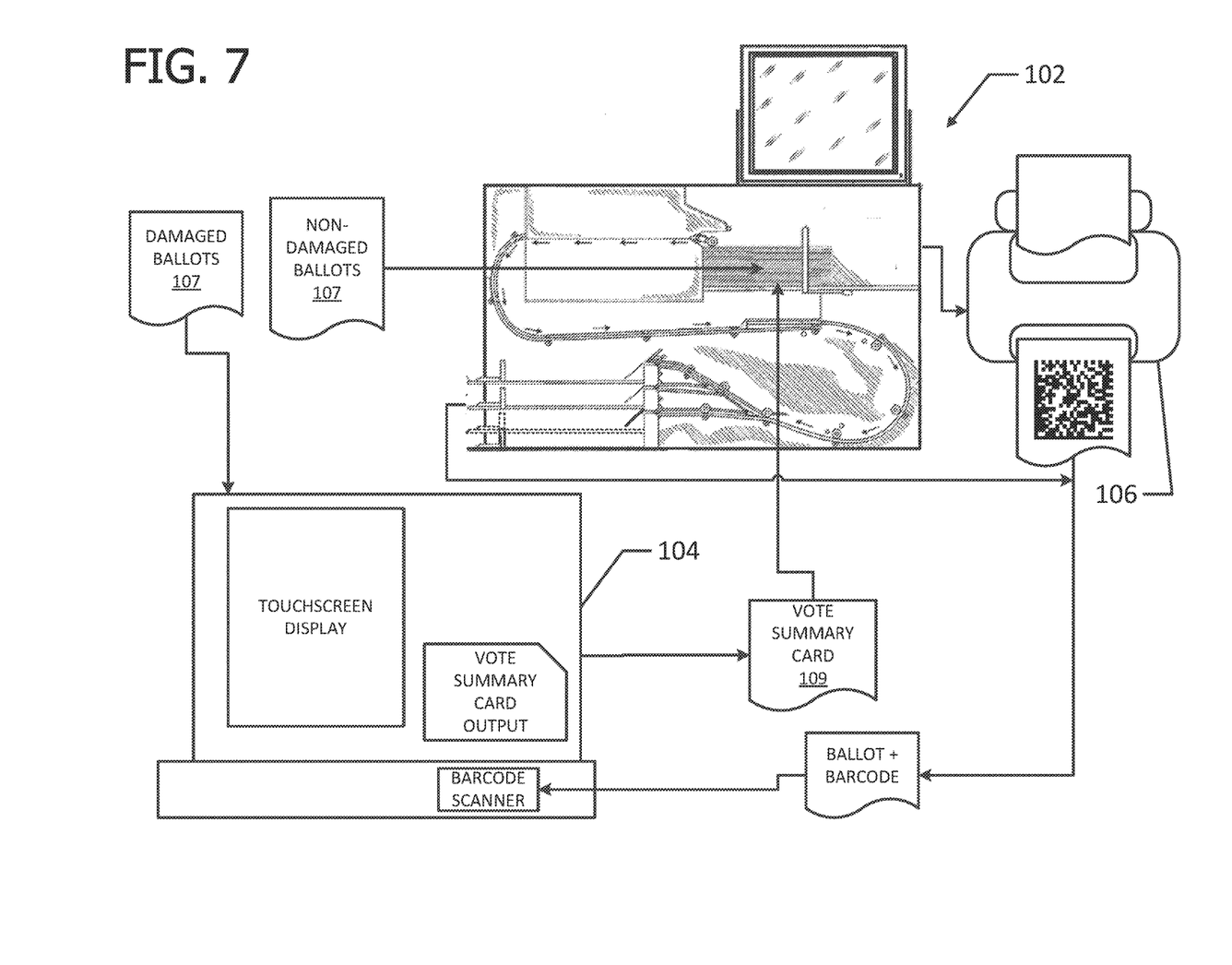
FIG. 7 illustrates another embodiment of an exemplary ballot adjudication system.

FIG. 7 illustrates another exemplary embodiment of ballot adjudication system 100. As illustrated, damaged ballots 107 go directly to universal voting system 104 to be remade. The ballot processing system 102 processes non-damaged ballots 107 and sorts ballots 107 that require adjudication (e.g., those having one or more improperly marked voting selections) into one or more special bins (e.g., hoppers, trays, etc.). A label printer (e.g., external printer 106, a printer comprising ballot processing system 102, etc.) prints a barcode (e.g., barcode 502) that includes an optical, machine-readable representation of at least one voting selection for each contest of the processed non-damaged ballot 107 having properly marked voting selections. The barcode is affixed to the corresponding processed non-damaged ballot 107 from the bin. A barcode scanner (e.g., barcode scanner 310) of universal voting system 104 scans the barcode affixed to the ballot 107. The universal voting system 104 fills in voting selections for all contests that were properly marked on the paper ballot 107, as indicated by the data of the scanned barcode. Utilizing universal voting system 104, an election official moves to contest(s) that need adjudication and enters voting selections for those contest(s). The universal voting system 104 prints a vote summary card (or a new, remade ballot) to be returned to ballot processing system 102 for tabulation and/or electronically casts the ballot.

In an embodiment, a system for processing a plurality of ballots includes an imager (e.g., cameras 206, 208), a ballot processor (e.g., ballot processing system 102), an output tray, an optical scanner (e.g., barcode scanner 310), a display (e.g., display 308), and a ballot marking processor (e.g., universal voting system 104). The ballots each include one or more contests (e.g., contests 504, 506, 508, 510) and one or more voting selections that can be marked with a marking for each contest. The imager is configured to generate an image of each of the plurality of ballots (e.g., ballot 107). The ballot processor is electrically coupled to the imager and is configured to process (402) the image of each ballot to determine (404) the propriety of markings of the voting selections of the ballots. The ballot processor is further configured to print (414) a barcode (e.g., barcode 502) for each ballot having at least one improperly marked voting selection (e.g., contests 504, 506, 508). The barcode includes a machine-readable representation of any properly marked voting selections (e.g., properly marked selections 406). The output tray is positioned to accumulate the ballots having at least one improperly marked voting selection. The optical scanner is configured to scan (416) the barcode for a respective ballot. The ballot marking processor is electrically coupled to the optical scanner and the display. The ballot marking processor is configured to extract the properly marked voting selections from the scanned barcode. The ballot marking processor is further configured to display (418) each contest requiring adjudication on the display and receive (420) voting selections for each contest requiring adjudication. The contests requiring adjudication include contests having improperly marked voting selections. The ballot marking processor is further configured to print (432) a vote summary card that includes machine-readable representations of the extracted properly marked voting selections (e.g., selections marked by the voter) and the received voting selections for each contest requiring adjudication (e.g., selections marked by an adjudicator).

In addition to the embodiments described above, embodiments of the present disclosure may comprise a special purpose computer including a variety of computer hardware, as described in greater detail below.

The following discussion is intended to provide a brief, general description of a suitable computing environment in which aspects of the disclosure may be implemented. Although not required, aspects of the disclosure are described in the general context of computer-executable instructions (i.e., software), such as application programs, program modules, and/or program data stored in memory for execution by computers. Generally, program modules include routines, functions, programs, objects, components, data structures, etc. that perform particular tasks or implement particular abstract data types when executed by a processor in a computer or other device. Computer-executable instructions, associated data structures, and program modules represent examples of the program code means for executing steps of the methods disclosed herein. The particular sequence of such executable instructions or associated data structures represent examples of corresponding acts for implementing the functions described in such steps. Advantageously, computer processors described herein have the capability to perform all operations (e.g., execute computer-executable instructions) in real-time. In addition, the functionality may be embodied in whole or in part in firmware or hardware equivalents such as integrated circuits, application specific integrated circuits (ASICs), field programmable gate arrays (FPGAs), and the like.

Embodiments within the scope of the present disclosure also include computer-readable media for carrying or having computer-executable instructions or data structures stored thereon. Such computer-readable media can be any available media that can be accessed by a special purpose computer. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. When used in a LAN networking environment, the computer is connected to the local network through a network interface or adapter. When used in a WAN networking environment, the computer may include a modem, a wireless link, or other means for establishing communications over the wide area network, such as the Internet. In a networked environment, program modules depicted relative to the computer, or portions thereof, may be stored in the remote memory storage device. It will be appreciated that the network connections described herein are exemplary and other means of establishing communications between computers over a network may be used. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for processing a plurality of ballots, the ballots each including one or more contests and one or more voting selections that can be marked with a marking for each contest, the system comprising:
    an imager configured to generate an image of each of the plurality of ballots;
    a ballot processor electrically coupled to the imager, the ballot processor configured to:
        process the image of each ballot to determine a propriety of the markings of the voting selections thereof, and
        print a barcode for each ballot having at least one improperly marked voting selection, wherein the barcode includes a machine-readable representation of any properly marked voting selections on such ballot;
    an output tray positioned to accumulate the ballots having at least one improperly marked voting selection;
    an optical scanner configured to scan the barcode for a respective ballot;
    a display; and
    a ballot marking processor electrically coupled to the optical scanner and the display, the ballot marking processor configured to:
        extract the properly marked voting selections from the scanned barcode;
        display each contest requiring adjudication on the display, the contests requiring adjudication comprising contests having improperly marked voting selections;
        receive voting selections for each contest requiring adjudication; and
        print a vote summary card, wherein the card comprises machine-readable representations of the extracted properly marked voting selections and the received voting selections for each contest requiring adjudication.

2. The system of claim 1, wherein the ballot processor comprises a report printer configured to print the barcode on a report, the report configured to be affixed to a respective ballot via a fastener.

3. The system of claim 1, wherein the ballot processor comprises a label printer configured to print the barcode on a label, the label configured to be affixed to a respective ballot via an adhesive backing of the label.

4. The system of claim 1, wherein the ballot processor comprises a barcode printer configured to print the barcode directly on a respective ballot.

5. The system of claim 1, wherein the barcode further includes a machine-readable representation of a serial number of the ballot and a machine-readable representation of each contest having improperly marked voting selections.

6. The system of claim 1, wherein the barcode is a matrix barcode.

7. The system of claim 1, further comprising a second output tray positioned to accumulate the ballots having no improperly marked voting selections.

8. The system of claim 1, wherein the ballot marking processor comprises a printer configured to print the vote summary card.

9. The system of claim 1, wherein the ballot marking processor comprises a communications interface configured to transmit data representative of the vote summary card to the ballot processor via an electronic data communications network.

10. The system of claim 1, wherein each contest requiring adjudication is presented on the display in a contrasting color relative to each contest having properly marked voting selections.

11. A computer-implemented method for processing a plurality of ballots, the ballots each including one or more contests and one or more voting selections that can be marked with a marking for each contest, the method comprising:
    generating an image of each of the plurality of ballots;
    determining a propriety of the markings of the voting selections of the ballots;
    printing a barcode for each ballot having at least one improperly marked voting selection, wherein the barcode includes a machine-readable representation of any properly marked voting selections on such ballot;
    accumulating the ballots having at least one improperly marked voting selection;
    scanning the barcode for a respective ballot;
    extracting the properly marked voting selections from the scanned barcode;
    displaying each contest requiring adjudication, the contests requiring adjudication comprising contests having improperly marked voting selections;
    receiving voting selections for each contest requiring adjudication; and
    printing a vote summary card, wherein the card comprises machine-readable representations of the extracted properly marked voting selections and the received voting selections for each contest requiring adjudication.

12. The method of claim 11, wherein said printing the barcode comprises:
    printing the barcode on a report; and
    affixing the report with the barcode printed thereon to a respective ballot via a fastener.

13. The method of claim 11, wherein said printing the barcode comprises:
    printing the barcode on a label having an adhesive backing; and
    applying the label with the barcode printed thereon to a respective ballot via the adhesive backing.

14. The method of claim 11, wherein said printing the barcode comprises printing the barcode directly on a respective ballot.

15. The method of claim 11, wherein the printed barcode further includes a machine-readable representation of a serial number of the ballot and a machine-readable representation of each contest having improperly marked voting selections.

16. The method of claim 11, wherein the barcode is a matrix barcode.

17. The method of claim 11, further comprising accumulating the ballots having no improperly marked voting selections in a second output tray.

18. The method of claim 17, further comprising tabulating:
    the voting selections of each ballot having no improperly marked voting selections from the images thereof, and
    the extracted properly marked voting selections and the received voting selections for each contest requiring adjudication from the machine-readable representations thereof from each vote summary card.

19. The method of claim 11, further comprising transmitting data representative of the vote summary card to the ballot processor via an electronic data communications network.

20. The method of claim 11, wherein said displaying each contest requiring adjudication comprises presenting each contest requiring adjudication on the display in a contrasting color relative to each contest having properly marked voting selections.

* * * * *